US008287265B2

(12) United States Patent
Errera

(10) Patent No.: US 8,287,265 B2
(45) Date of Patent: Oct. 16, 2012

(54) LOW COST CURVED BOTTOM FOOD STAMPER

(76) Inventor: Richard Ben Errera, Pembroke Pines, FL (US)

(*) Notice: Subject to any disclaimer, the term of this patent is extended or adjusted under 35 U.S.C. 154(b) by 404 days.

(21) Appl. No.: 12/462,865

(22) Filed: Aug. 11, 2009

(65) Prior Publication Data
US 2010/0068321 A1 Mar. 18, 2010

(51) Int. Cl.
*A21C 11/00* (2006.01)
(52) U.S. Cl. ........ 425/299; 425/318; 425/385; 425/812; 249/140; 249/141; 426/383
(58) Field of Classification Search ............... 425/298, 425/299, 193, 195, 318, 385, 388, 403, 470, 425/812; 249/91, 92, 119, 120, 140, 141; 426/383; 264/132; 99/340, 376, 380, 388, 99/427; D18/14, 15, 18, 56, 57, 59; 101/15, 101/16, 31.1, 370, 373, 382.1, 282, 289, 101/405–406, 409, 479, 480
See application file for complete search history.

(56) References Cited

U.S. PATENT DOCUMENTS

| | | | | | |
|---|---|---|---|---|---|
| 2,008,725 | A | * | 7/1935 | Parker | 249/74 |
| 2,119,260 | A | * | 5/1938 | Valle | 30/301 |
| 2,791,960 | A | * | 5/1957 | Pietropinto | 99/439 |
| 4,348,166 | A | * | 9/1982 | Fowler | 425/310 |
| D283,964 | S | * | 5/1986 | Shun | D7/675 |
| 4,656,927 | A | * | 4/1987 | Mosby et al. | 99/388 |
| 5,303,473 | A | * | 4/1994 | Sadler | 30/128 |
| 5,576,031 | A | * | 11/1996 | Uchida et al. | 425/130 |
| 5,665,299 | A | * | 9/1997 | Uchida et al. | 264/510 |
| 5,693,141 | A | * | 12/1997 | Tramont | 118/211 |
| D417,464 | S | * | 12/1999 | Skopek | D18/15 |
| D448,402 | S | * | 9/2001 | King | D18/15 |
| 6,324,977 | B1 | * | 12/2001 | Hadden | 101/405 |
| 6,431,849 | B1 | * | 8/2002 | Capodieci | 425/174.2 |
| 6,851,192 | B2 | * | 2/2005 | So | 30/306 |
| 6,990,892 | B2 | * | 1/2006 | Errera | 99/388 |
| 7,252,491 | B2 | * | 8/2007 | Errera | 425/96 |
| 7,331,776 | B2 | * | 2/2008 | Errera | 425/298 |
| 7,819,650 | B2 | * | 10/2010 | Meskendahl et al. | 425/230 |
| 2002/0050215 | A1 | * | 5/2002 | King | 101/41 |

FOREIGN PATENT DOCUMENTS
WO  WO 2004002229 A2 * 1/2004
* cited by examiner

*Primary Examiner* — Dimple Bodawala
(74) *Attorney, Agent, or Firm* — Alfred M. Walker; Lee Grosskreuz Hechtel

(57) ABSTRACT

A low cost vented hand operable food embosser/debosser for food items is used to emboss messages and/or decorative patterns on a variety of food items such as pizza dough or even ice cream. It can also be used on non-food items such as soap or wax. The message image member of the stamper is vented, with a hollow venting chimney above each image for venting excess food product away from the food product bearing the image. In addition the images are surrounded by a suppressing wall suppressing food product from being inadvertently squashed too much The venting chimneys above each letter are preferably curved, and the images are sharp at the edges with pointy tipped letters/images.

11 Claims, 6 Drawing Sheets

CELEBRATE!
☺BIRTHDAY
♡WISHES
CONGRATS!
L♡VE Y♡U
☆YUMMY☆
☺ PARTY
☺ENJOY☺
•HOME MADE•
☺HOUSE•SPECIAL
•TASTY SMILES•
H☺LIDAY CHEERS

Fig. 6

LOW COST CURVED BOTTOM FOOD STAMPER

RELATED APPLICATIONS

This application in part discloses and claims subject matter disclosed in part in my earlier filed patent application entitled FOOD EMBOSSING AND IMPRESSING DEVICE, the specification of which was filed on Jun. 5, 2006 as application Ser. No. 11/447,216, now abandoned and published as United States Patent Publication number 2006/0225579 A1 dated Oct. 12, 2006, which application is based upon provisional application 60/802,481 of May 22, 2006 from which provisional application Applicant claims priority under 35 USC §119(e) and which application Ser. No. 11/447,216 is a continuation-in-part of application Ser. No. 11/068,275 filed on Feb. 28, 2005, now abandoned and published as United States Patent Publication number US 2005/0150394 A1 on Jul. 14, 2005, which application Ser. No. 11/068,275 is a continuation-in-part of application Ser. No. 10/423,562, filed on Apr. 23, 2003, and published as U.S. Pat. No. 7,252,491 B2 of Aug. 7, 2007, which application Ser. No. 11/068,275 is also a continuation-in-part of application Ser. No. 10/404,376; which was filed on Apr. 1, 2003 and published as U.S. Pat. No. 7,331,776 B2 of Feb. 19, 2008, which application Ser. No. 11/068,275 is also a continuation-in-part of application Ser. No. 10/634,438; the specification of which was filed on Aug. 5, 2003 now abandoned as published as United States Patent Publication number US 2004/0040445 A1 published Mar. 4, 2004, which application Ser. No. 11/068,275 is also a continuation-in-part of application Ser. No. 10/634,439 of which was filed on Aug. 5, 2003 and published as U.S. Pat. No. 6,990,892 of Jan. 31, 2006, and which application Ser. Nos. 10/423,562, 10/404,376, 10/634,438 and 10/634,439 were based upon provisional application Ser. No. 60/406,448 of Aug. 28, 2002, from which provisional application applicant claims priority under 35 USC 119 (3) therefrom. Applicant Claims priority under 35 USC 120 from application Ser. Nos. 11/447,216, 11/068,275, 10/423,562, 10/404,376, 10/634,438 and 10/634,439. This application incorporates the foregoing published applications and patents by reference herein.

FIELD OF THE INVENTION

The present disclosure relates to a device which forms raised/embossed or impressed forms in the surface of foods, such as a pizzeria name or logo.

BACKGROUND OF THE INVENTION

Commercial and home cooks often decorate food surfaces for formal dinners, birthdays and special occasions. Foods may be decorated with edible flowers, icing, coloring tubes for writing of a sugar based paste, and/or edible wafers having images of photographs.

A number of known devices are designed to form a pattern, design or silhouette in food while the device also cooks the food, such as, for example, U.S. Pat. Nos. 5,996,476 to Schultz; 5,642,659 to Seasona et al., and 5,789,009, invented by Kordic et al. The patent to Mosby et al., U.S. Pat. No. 4,656,927, describes a device for producing designs on a slice of bread during toasting by shielding the bread in the shape of the design from the heat and thereby forming an image on the surface of the bread. Fiorenza, U.S. Pat. No. 4,290,349, discloses a toaster accessory which is dimensioned to fit a pre-made sandwich into a conventional toaster and optionally form decorative designs with inserts panels.

Other devices produce edible decorations which may be placed on food surfaces as desired, see, for example, U.S. Pat. No. 6,242,026 to Feeley. Alternatively, U.S. Pat. No. 4,578,273 to Krubert discloses a method of forming a hard, non-porous icing surface by drying an icing mixture and printing one or more edible inks on the icing using a printing pad having an edible silicone oil. The Quinlivan U.S. Pat. No. 4,285,978, discloses a method of transferring decorative designs onto baked goods by transferring a pre-printed design from a transfer material to an uncooked dough surface. Macpherson et al., in U.S. Pat. No. 5,017,394, describe a method of using a silk screen to form thin, flat, flexible, free standing base shapes or transfers directly on release paper to produce the final edible image for decorating foodstuffs. Ahn, in U.S. Pat. No. 5,834,047, discloses a method of imprinting shapes of multiple colors inside confectionery products with edible ink.

U.S. Pat. No. 5,992,305 to Naivar describes a device that forms char marks to mimic a grill pattern on the surface of foods.

Older devices are known which may shape and cut dough foods such as, for example, an elongate rolling pin designed to roll and cut dough into long strips, a rolling pin designed to cut dough into shapes rather than using individual cookie cutters, and a rolling pin designed to form ravioli by pinching two layers of dough together at preset intervals after filing had been placed between the layers. See, U.S. Pat. Nos. 522,465 to Goodnough; 2,099,286 to Usbeck; and 2,075,157 to Alberti, respectively. Additionally, a U.S. Pat. No. 177,319, to Blaul, discloses a rolling pin having a permanently affixed intaglio, or engraved/carved, pattern to form shapes in the dough.

Also known is a dual rolling pin device having two rolling pins in the same plane and container means located above the rolling pins to emit flour over the surface of the rolling pins to prevent dough from sticking to the pins while in use. See, U.S. Pat No. 4,426,200 to Miller.

Frequently, writing is desired on various foodstuffs where the use of icing or a sugar base paste is undesirable. Therefore, an alternative device would be useful for marking foods on special occasions or, for example, re-enforcing the name of a pizzeria or bakery on pizza or breadsticks. Therefore, it would be advantageous to provide a device to mark foods.

OBJECTS OF THE INVENTION

The object of this invention is to provide a low cost hand stamper for food items that is convenient to use and has superior performance. The stamper can be used to emboss messages and/or decorative patterns on a variety of food items such as pizza dough or even ice cream. It can also be used on non-food items such as soap or wax.

Other objects which become apparent from the following description of the present invention.

SUMMARY OF THE INVENTION

In keeping with these objects and others which may become apparent, the present invention is a low cost vented hand stamper for food items that is convenient to use and has superior performance. The stamper can be used to emboss messages and/or decorative patterns on a variety of food items such as pizza dough or even ice cream. It can also be used on non-food items such as soap or wax.

The message image pad of the stamper is vented, with a hollow venting chimney above each image for venting excess food product away from the food product bearing the image.

In addition the images are surrounded by a suppressing wall suppressing food product from being inadvertently squashed too much The venting chimneys above each letter are preferably curved, and extend in opposite directions from the image message pieces that are sharp at the edges with pointy tipped letters/images.

The material can be a plastic polymer and/or metal and other similarly hard materials.

The preferred embodiment of the vented stamper includes two major parts, a housing with a handle on top, and a removable message pad that is engaged with the housing. In fact many message pads with different messages and/or decorative patterns are provided to be able to use the same housing to suit many occasions or themes. The low cost aspect relates to the construction of the stamper using plastic resins and injection molding for both the housing as well as the message pads.

The food contact portion of the preferred embodiment for the message pad is shaped as a shallow convex circular arc to the food item so that the message is rolled onto the food with a short contact patch sequentially touching the food surface. This enhances the pressure to the food item for a modest downward force providing a more crisp distinct result. The message letters or decorative symbols project out about 6 mm (about ¼ inch) from a wall at the bottom of the message pad. The letters and symbols are hollow or vented and have sharp beveled edges. When pressed against a food item, the front letter/symbol projection easily cuts into the food item while the flat surrounding wall flattens and suppresses the food thereby causing some food to rise within the hollow portion to create an embossed image. To enhance this ability and to facilitate cleaning, the letter/symbols are extended inward past the wall as hollow cylinders, having an open top end with a letter/symbol crossection, for a length of approximately 18 mm (about ¾ inch).

The message pads of the preferred embodiment conveniently glide into the lower housing message pad receiving chamber from the front side. The lower housing message pad receiving chamber is open at the front and bottom with grooves at the inner sides near the bottom and along the lower curved edge of the back. The message pad has a front vertical flange that fits the front opening and has rail extensions along the sides and back of the bottom wall surface which fit into the grooves inside the lower housing message receiving chamber. So, the message pad is simply guided into the grooves and pushed in; it is retained by a molded latch feature with a distinct "click". It is easily removed by sliding out for replacement or cleaning. Note that the message pad is securely supported by the housing on all four edges.

Alternatively, the vented message pads can be inserted from the front or rear of the housing chamber, in addition to the embodiment form the sides.

Alternatively the vented message pads can be attached by snapping on or off to the housing.

In further embodiments, such as in FIGS. 30-33 of my pending published application filed under Ser. No. 11/447,216 and published as Publication number US 2006/0225579 A1 of Oct. 12, 2006, the at least one message piece can be attached to a roller wheel, either individually or in a strip of a plurality of image pieces. The venting chimneys can also be applied to the message blocks 27 of FIGS. 4-7, the message strips 40 of FIGS. 8 and 9, the message pad 88 of FIG. 16, the message phrase piece of 156 of FIGS. 28 and 29, vented message characters 166 of FIG. 36, message bearing tines 206 of FIGS. 37 and 38, flexible message tine strips 220 of FIG. 39, message bearing tines 250 of FIG. 42, letter tracks 276 of FIG. 43, impression wheel 306 of FIG. 50, stamper 354 of FIG. 58 or message plate 396 of FIG. 61, as well as any other embodiment within the scope of the disclosure herein.

Optionally, the vented message pieces can be attached permanently to a message wheel as in my issued U.S. Pat. No. 7,252,491 B2 of Aug. 7, 2007, with the vented chimney feature extending inward away from the image pieces of the message wheel.

Furthermore, the vented message pieces can be attached permanently to a message stamper pad as in my issued U.S. Pat. No. 7,331,776 B2 of Feb. 19, 2008, with the vented chimney feature extending upward away from the image pieces of the message stamper pad.

BRIEF DESCRIPTION OF THE DRAWINGS

The present invention can best be understood in connection with the accompanying drawings. It is noted that the invention is not limited to the precise embodiments shown in drawings, in which:

FIG. 6 is a sampling of messages for message pads for different venues and occasions.

DETAILED DESCRIPTION OF THE INVENTION

Figure 1:
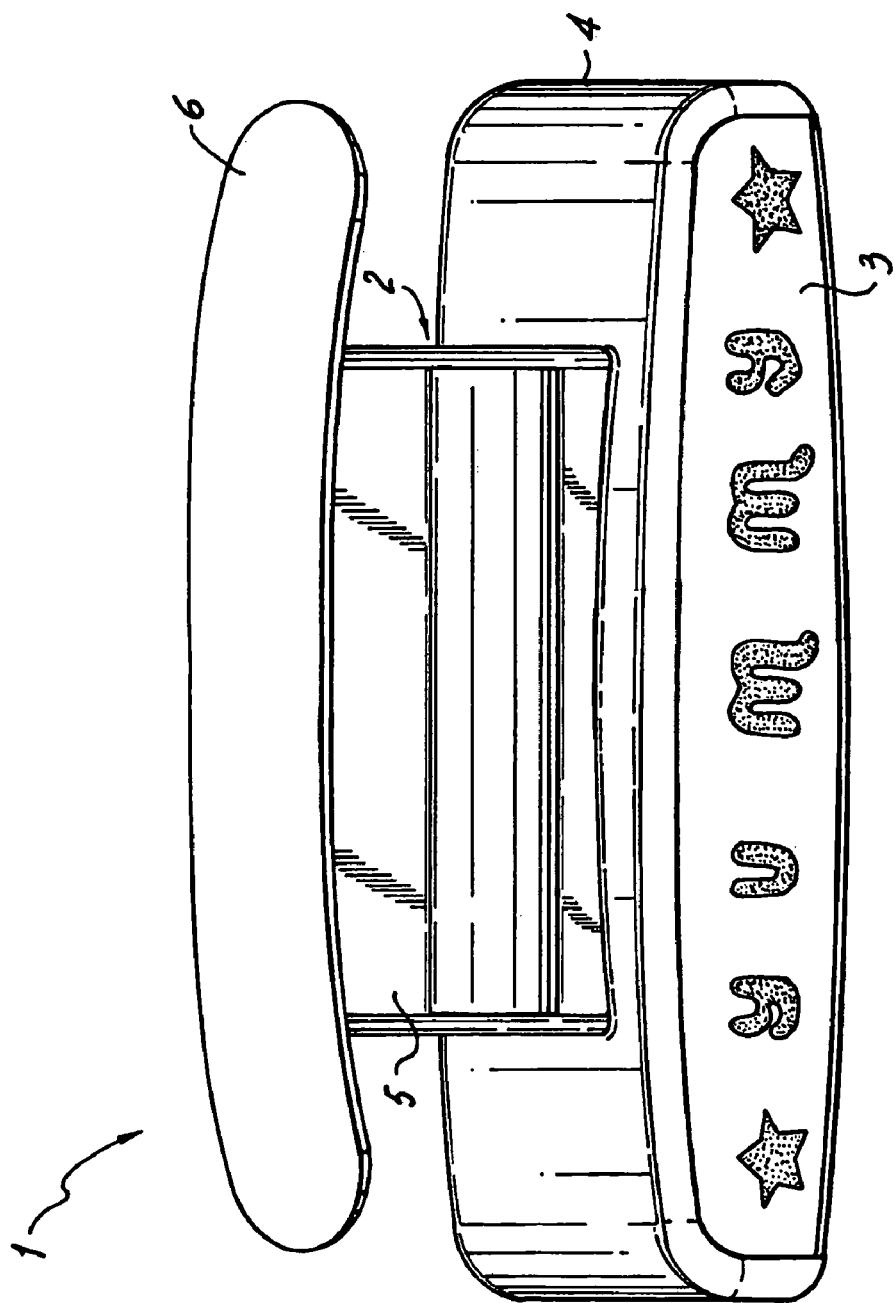
FIG. 1 is a perspective view of the food stamper of this invention in an upright position.

Although other embodiments may be known through the disclosure herein, FIG. 1 shows the preferred embodiment of vented stamper 1 of this invention with housing 2 and message pad 3. The lower message pad chamber 4, structural mid-section 5, and handle 6 are also shown. In this view, only the vertical front flange of message pad 3 is shown. It is a convenient location for printing an image of the message to be imprinted which is not visible with vented stamper 1 in an upright position. Note that the top of mid-section 5 is open for easy cleaning when message plate 3 is removed.

Figure 2:
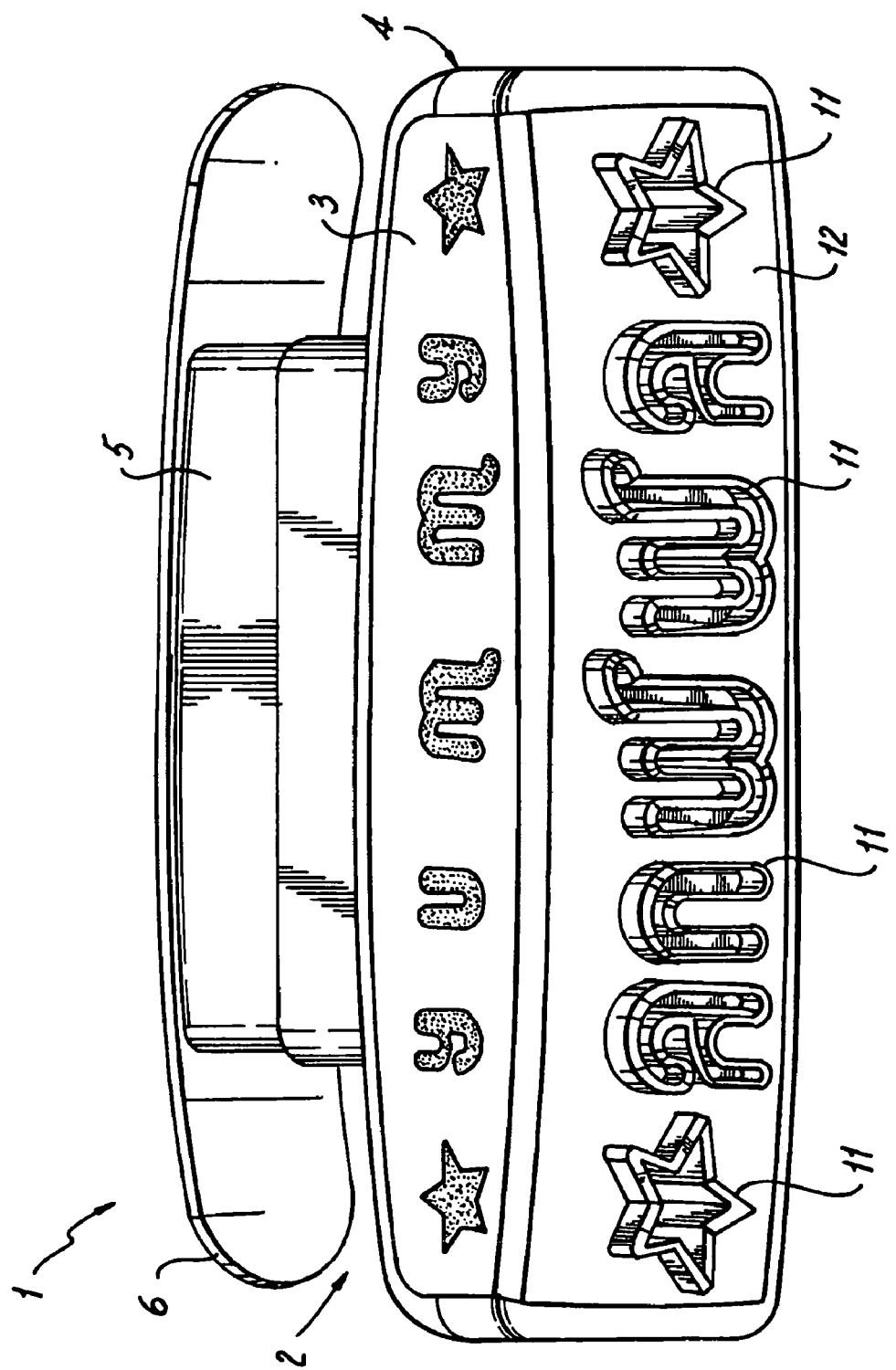
FIG. 2 is a perspective view of the food stamper on its side revealing the food contact surface of the message pad.

FIG. 2 shows vented stamper 1 on its side so that the food contact area can be easily viewed. Note that the bottom surface follows a shallow circular convex curvature with approximately a 651 mm radius (approximately 25.63 inches from an imaginary center of a circle). The overall dimensions of vented stamper 1 are approximately 90 mm high (about 3⅔ inches), 163 mm long (about 6.42 inches), and 43 mm deep (about 1.69 inches). Note letters/symbols 11 protruding from wall surface 12 by approximately 6 mm (about ¼ inch) in height. The letters 11 have sharp beveled ends and hollow interiors which extend inward beyond surface 12.

Figure 3:
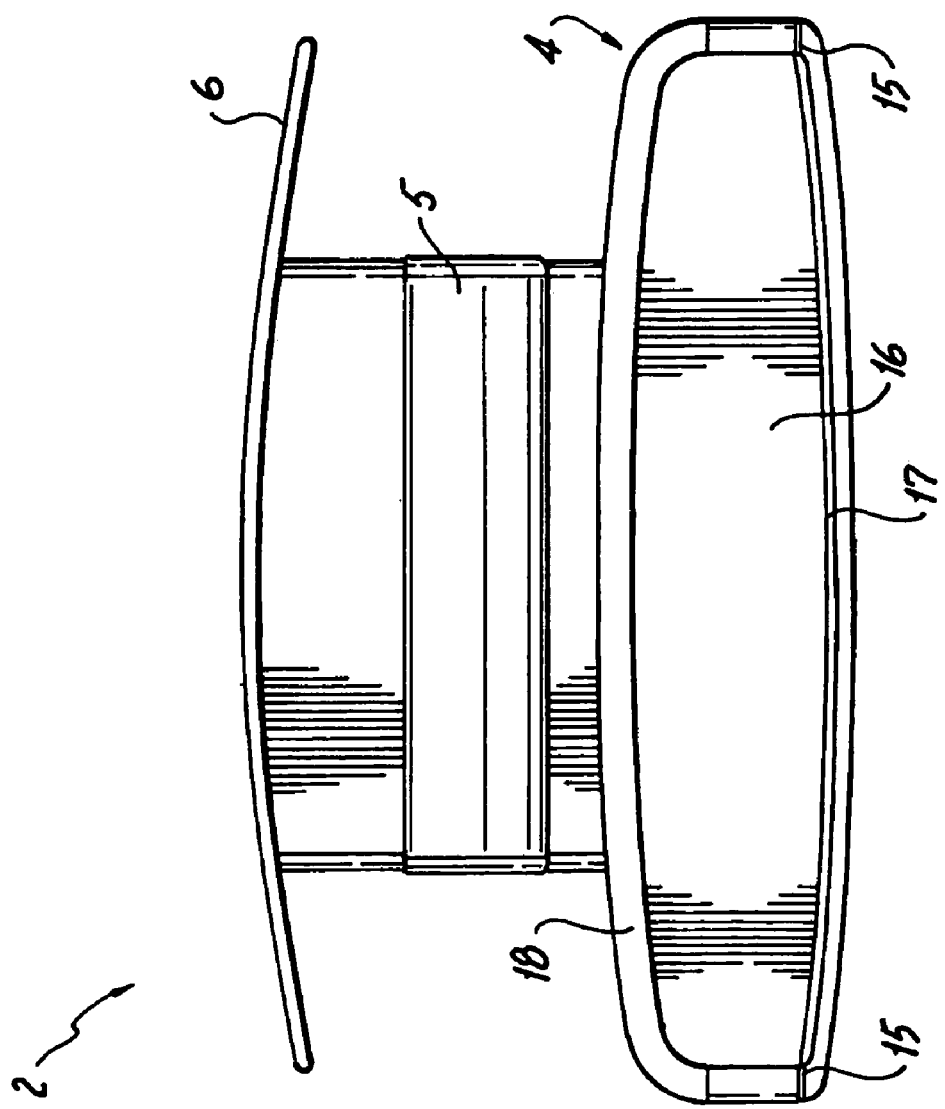
FIG. 3 is a side elevation of the housing of the stamper with the message pad removed.

FIG. 3 is a side view of housing 2 with the message pad 3 removed. Front edge 18 frames the vertical flange of message pad 3 when installed. The back 16 of message pad housing 4 has a lower edge groove 17 and side grooves 15 which mate with protrusions along the edge of message pad 3.

Figure 4:
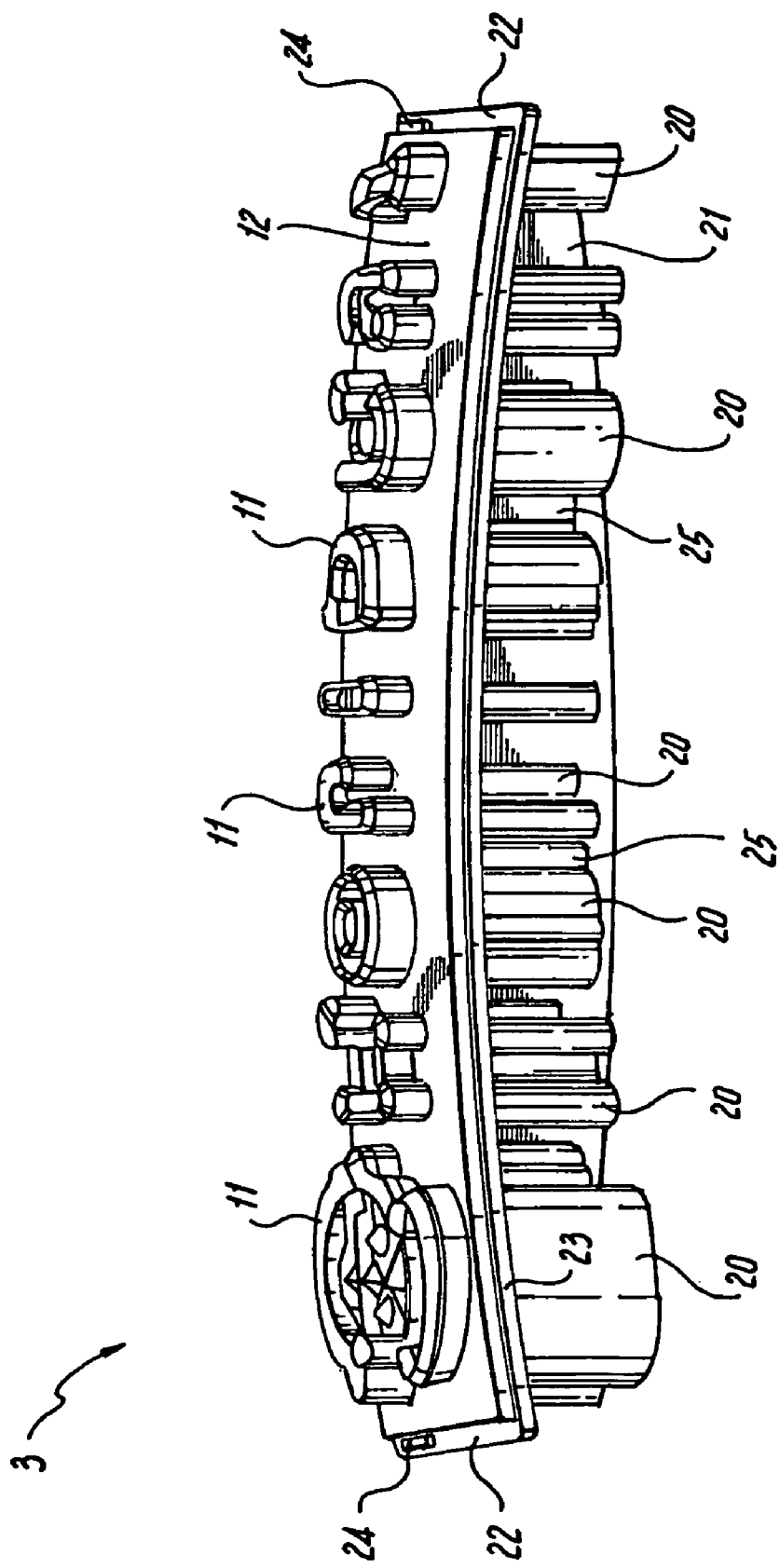
FIG. 4 is a perspective view of the message pad from the rear showing the long cylindrical extensions of the letters/symbols.

FIG. 4 shows message pad 3 with the food contact surface upward and being viewed from the back side. Here, letter/symbol elements 11 can be seen extending to the rear of surface 12 as hollow cylindrical elements 20 of about 18 mm (about ¾ inch) in height. Protruding back edge 23 fits into groove 17 of housing 2 when installed. Likewise, side extensions 22 fit grooves 15 of housing 2. Elements 25 are molded internal flanges (as needed) to more rigidly attach bottom surface 12 to the back 21 of the front flange of message pad 3.

Figure 5:
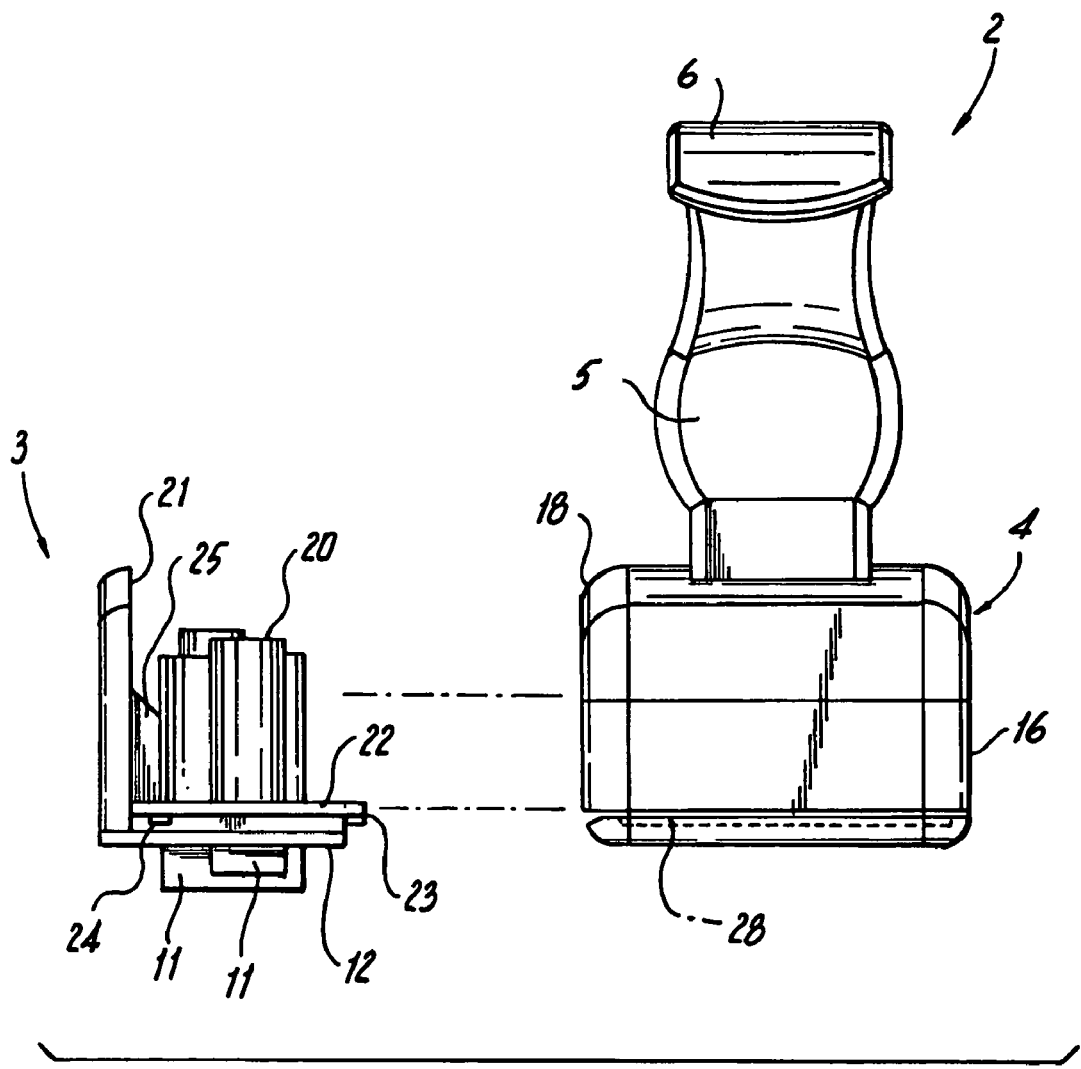
FIG. 5 is an end view of the stamper housing adjacent to an end view of a message pad.

FIG. 5 shows an end view of housing 2 adjacent to message pad 3 poised for lateral insertion. Note molded bump 24 on pad 3 (also seen in FIG. 4) and molded recess 28 (in dashed lines) in housing 2 which form the retention latch which "clicks". One such pair on each side is used in this embodiment.

Alternatively, the message pads can be inserted from the front or rear of the housing chamber, in addition to the embodiment form the sides.

Alternatively the message pads can be attached by snapping on or off to the housing.

FIG. 6 is an image of some of the standard message pad messages. Custom messages and advertising logos can be easily molded for individual customers and especially for food service chains.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A low cost curved vented food embosser/debosser configured to form raised/embossed/impressed images in a surface of food products, such as pizzeria name or logo, wherein said embosser/debosser comprising:

a housing (2) having handle (6);

wherein said housing (2) holding a removable, vented message image pad (3) containing at least one image piece (11) with a food contact bottom portion adapted to emboss or deboss said image into the surface of the food product;

a hollow venting chimney (20) located above said at least one image piece (11), wherein said hollow chimney configured to vent excess food product away from said food product bearing the image;

said at least one image piece (11) being surrounded by a suppressing wall configured to suppress adjacent food product from being inadvertently squashed too much;

said at least one image piece (11) being sharp at is respective edge with a pointy tip;

said housing (2) having a lower message pad receiving housing chamber (4);

wherein said message pad (3) configured to glide laterally into a side of said lower message pad receiving housing chamber (4);

wherein said lower message pad receiving housing chamber (4) has open section; wherein said lower message pad receiving housing chamber (4) has a plurality of side grooves (15) at respective inner sides near a bottom of said lower message pad receiving housing chamber (4); and a lower edge groove (17) extending along a lower curved edge of a back of said lower message pad receiving housing chamber (4), wherein said side grooves (15) and said lower edge groove (17) configured to receive said message pad (3);

wherein said message pad (3) has a front vertical flange which is configured to be received in a front edge (18) of said lower message pad receiving housing chamber (4); wherein said message pad (3) has rail extensions (22, 23) along respective sides and back of a bottom wall surface of said message pad (3), which fit into respective said grooves of said lower message pad receiving housing chamber (4); wherein said side surface of said message pad (3) has a molded bump (24) which is configured to receive in a molded recess (28) of said housing (2), and configured to form retention latch for retaining said message pad (3) within the housing (2).

2. The vented food embosser/debosser as in claim 1 wherein said housing and said message pad are made of a material selected from the group consisting of a plastic polymer or a metal.

3. The vented food embosser/debosser as in claim 1 wherein said at least one image piece is a plurality of image pieces forming a multi-piece image.

4. The vented food embosser/debosser as in claim 1 wherein said food contact portion of said image message pad is shaped as a shallow convex circular arc to the food item so that the message is rolled onto the food with a short contact patch sequentially touching the food surface.

5. The vented food embosser/debosser as in claim 1 wherein said message piece has a height projecting out about 6 mm from a wall at the bottom of said message pad.

6. The vented food embosser/debosser as in claim 1 wherein said chimney extends above said at least one image piece projecting out about 18 mm from a wall at the bottom of said message pad, in a direction opposition to a direction of said message piece.

7. The vented food embosser/debosser as in claim 1 wherein said at least one image piece is hollow and has a sharp beveled edges.

8. The vented food embosser/debosser as in claim 1 wherein each said image piece is surrounded by a flat surrounding wall which flattens and suppresses the food product, thereby causing some food to rise within said hollow chimney to create an embossed image.

9. The vented food embosser/debosser as in claim 1 wherein said message pad is insertable into a front of said lower message pad receiving housing chamber.

10. The vented food embosser/debosser as in claim 1 wherein said message pad is insertable into a rear of said lower message pad receiving housing chamber.

11. The vented food embosser/debosser as in claim 1 wherein said message pad snaps onto a lower portion of said lower message pad receiving housing chamber.

* * * * *